United States Patent
Clark et al.

(10) Patent No.: US 12,135,051 B2
(45) Date of Patent: Nov. 5, 2024

(54) METHOD OF RETAINING A SLEEVE WITH LOW FORCE

(71) Applicant: Illinois Tool Works Inc., Glenview, IL (US)

(72) Inventors: Chad M. Clark, Stamping Ground, KY (US); Jason Paradis, Bristol, CT (US); Gregory G. Buczynski, Ferndale, MI (US); Ronald C. Owens, Lawrenceburg, KY (US)

(73) Assignee: Illinois Tool Works Inc., Glenview, IL (US)

( * ) Notice: Subject to any disclaimer, the term of this patent is extended or adjusted under 35 U.S.C. 154(b) by 170 days.

(21) Appl. No.: 17/726,047

(22) Filed: Apr. 21, 2022

(65) Prior Publication Data
US 2022/0341458 A1 Oct. 27, 2022

Related U.S. Application Data

(60) Provisional application No. 63/178,576, filed on Apr. 23, 2021, provisional application No. 63/178,574, filed on Apr. 23, 2021.

(51) Int. Cl.
*F16B 37/04* (2006.01)
(52) U.S. Cl.
CPC ............ *F16B 37/043* (2013.01); *F16B 37/04* (2013.01)
(58) Field of Classification Search
CPC .... F16B 5/0208; F16B 5/0233; F16B 5/0258; F16B 37/04; F16B 37/041; F16B 37/043; F16B 37/044; F16B 37/045; F16B 43/001; B60R 16/0215; B60R 16/0222

USPC .............................. 411/172, 173, 383; 16/2.1
See application file for complete search history.

(56) References Cited

U.S. PATENT DOCUMENTS

| | | | | |
|---|---|---|---|---|
| 3,091,795 A | * | 6/1963 | Budwig | F16L 5/027 439/550 |
| 4,863,329 A | * | 9/1989 | Wilson | F16B 9/056 411/383 |
| 5,069,586 A | * | 12/1991 | Casey | F16B 5/01 411/908 |
| 5,093,957 A | * | 3/1992 | Do | E04C 2/365 52/793.1 |
| 6,328,513 B1 | * | 12/2001 | Niwa | F16F 1/362 411/339 |
| 7,895,709 B2 | * | 3/2011 | Shishikura | F16B 37/043 411/335 |
| 8,920,089 B1 | * | 12/2014 | Stewart | F16B 5/0208 411/433 |
| 2001/0049858 A1 | * | 12/2001 | Huet | B62D 25/24 16/2.1 |

(Continued)

*Primary Examiner* — Roberta S Delisle
(74) *Attorney, Agent, or Firm* — McAndrews, Held & Malloy, Ltd.

(57) ABSTRACT

Disclosed are fastening systems for coupling a first component to stud, shaft, or the like via a sleeve assembly. The fastening system comprising an upper sleeve component, a lower sleeve component, and a nut. The upper sleeve component defines an upper sleeve opening, while the lower sleeve component defines a lower sleeve opening. The lower sleeve component comprises one or more flexible tabs configured to engage the upper sleeve component via the component opening. The nut is configured to pass through a sleeve opening to engage the stud. The sleeve opening is defined by the upper sleeve opening and the lower sleeve opening.

20 Claims, 10 Drawing Sheets

(56) References Cited

U.S. PATENT DOCUMENTS

| | | | | |
|---|---|---|---|---|
| 2009/0064454 A1* | 3/2009 | Anderson | ................ | E05D 5/14 |
| | | | | 16/2.1 |
| 2010/0101045 A1* | 4/2010 | Van Walraven | ...... | F16L 55/035 |
| | | | | 16/2.1 |
| 2011/0162165 A1* | 7/2011 | Schumacher, Jr. | ..... | B32B 37/14 |
| | | | | 156/253 |
| 2018/0323597 A1* | 11/2018 | Joubeaux | ............... | H02G 9/025 |

\* cited by examiner

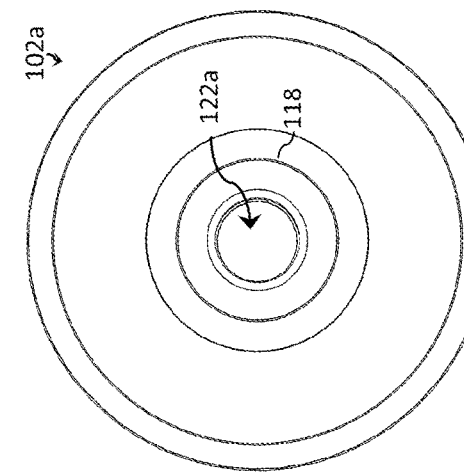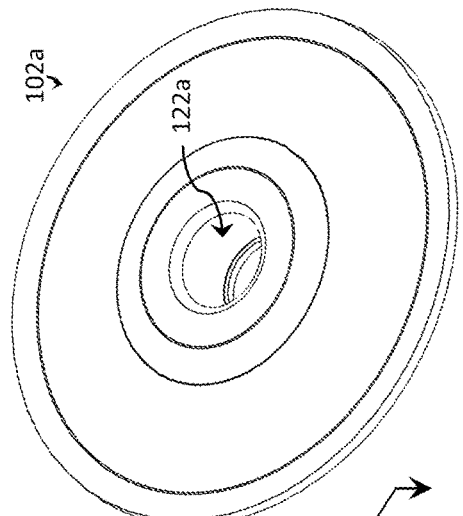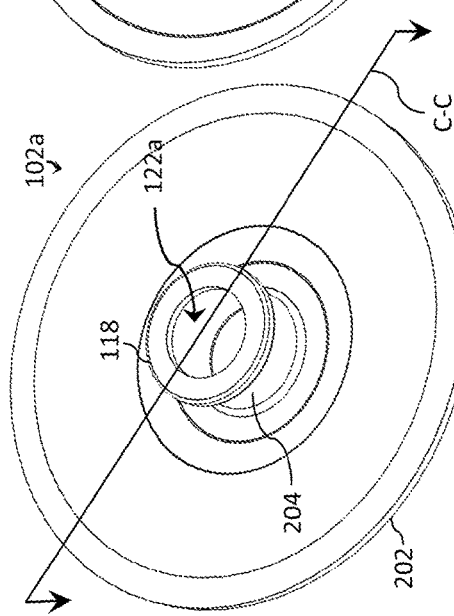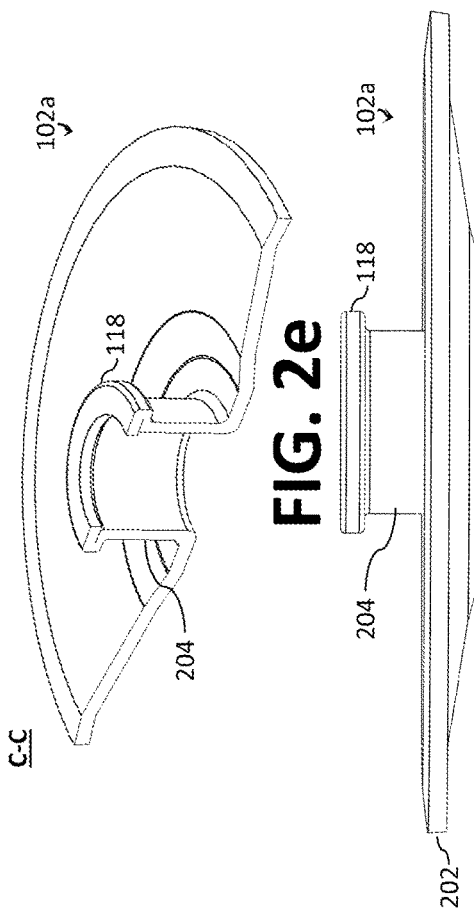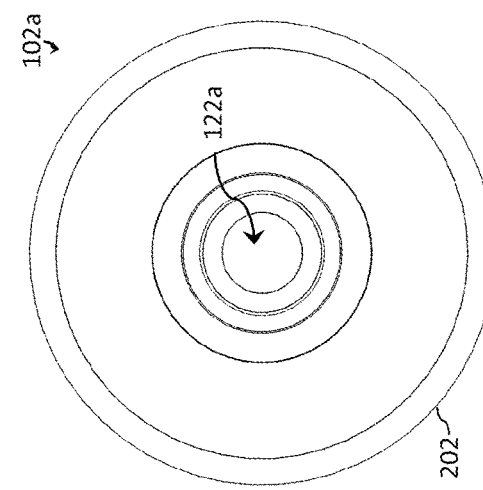
FIG. 2a FIG. 2b FIG. 2c FIG. 2d FIG. 2e FIG. 2f

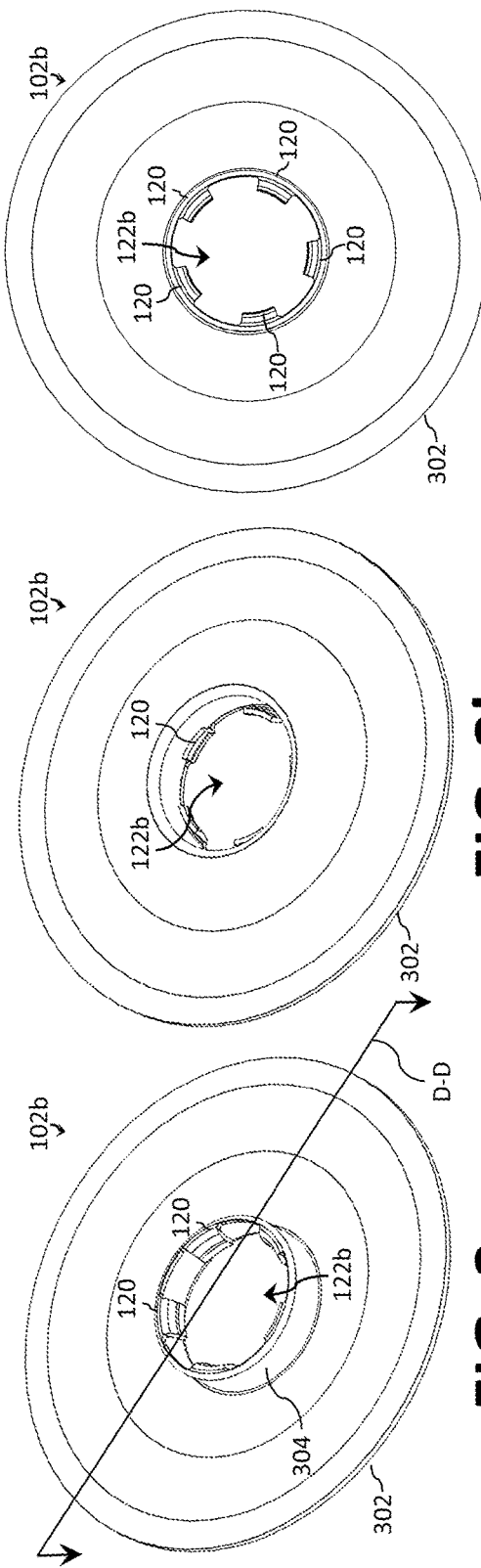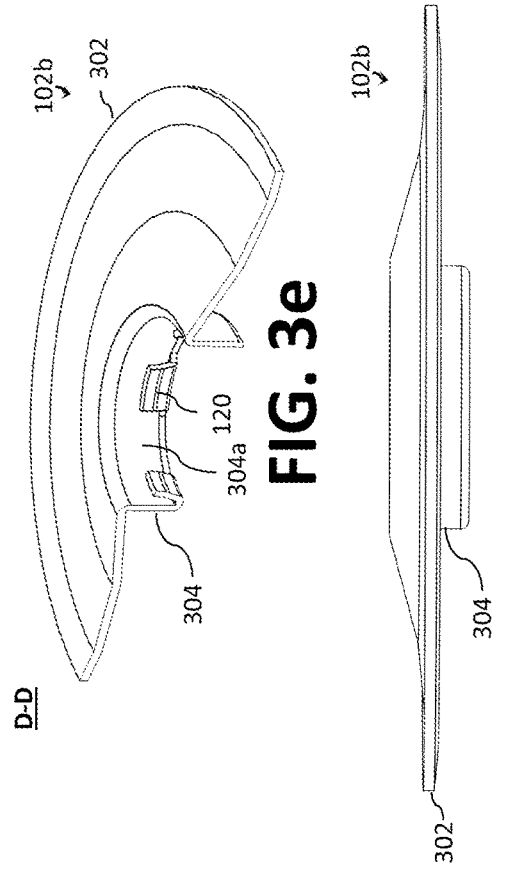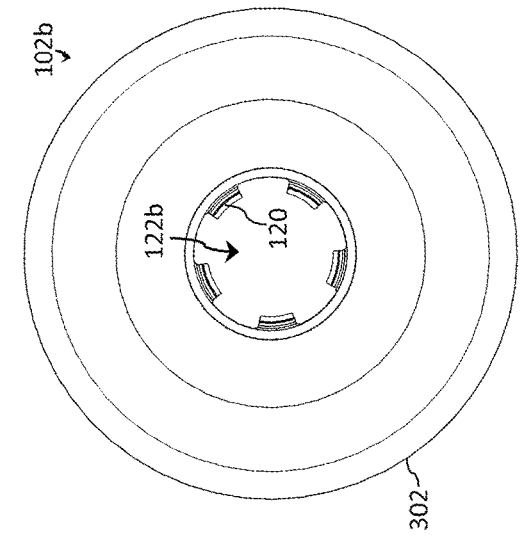

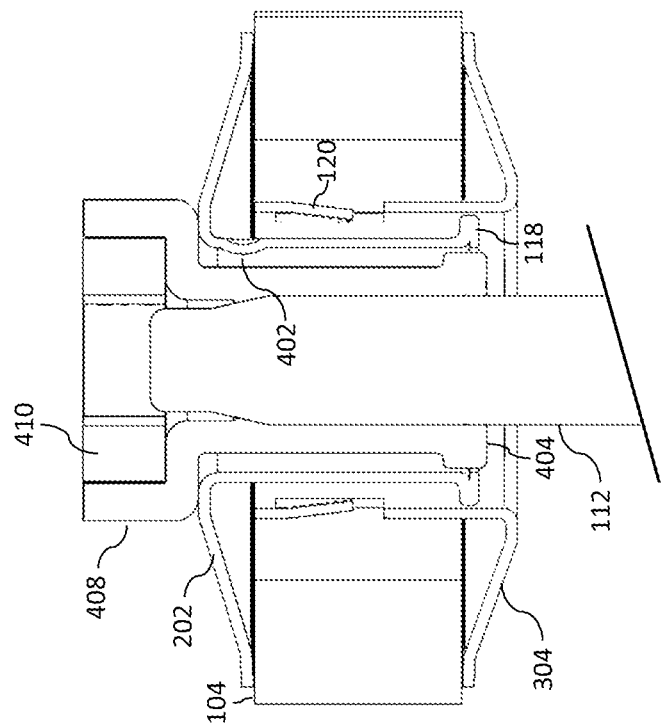
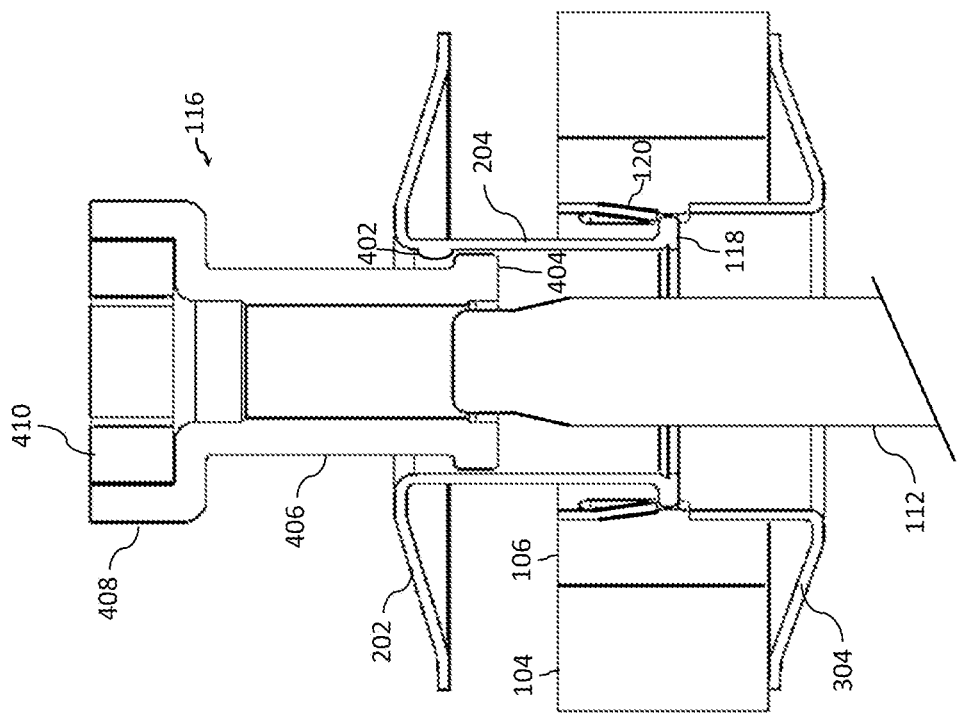
FIG. 4d
FIG. 4c

METHOD OF RETAINING A SLEEVE WITH LOW FORCE

CROSS-REFERENCE

The present application claims the benefit under 35 U.S.C. § 119(e) of U.S. Provisional Patent Application Ser. Nos. 63/178,574 and 63/178,576; each of which was filed on Apr. 23, 2021 and is entitled "Method Of Retaining A Sleeve With Low Force." The contents of each of the foregoing applications are hereby incorporated by reference.

BACKGROUND

Automotive components require fastening techniques that are simple to manufacture and assemble. Further, fastening techniques should above all be reliable and efficient.

In order to secure a component, a fastening assembly may be used to engage a stud via a bolt. In some cases, a sleeve assembly is secured a component via a component opening located on the component. When the stud is fixed, alignment can be more complicated. In addition, existing sleeve assemblies and associated fastener components can require excessive force during assembly, thereby making them more difficult to assemble by hand.

Therefore, it would be desirable to provide a fastening assembly that can be captured into a component, telescope up or down to allow the component to be fully seated before fastening, and/or offer tolerance compensation. In addition, it would be desirable to provide a fastening assembly that can be attached using low insertion force.

SUMMARY

The present disclosure relates generally to a fastening assembly with increased tolerance compensation that can telescope up or down and/or be attached using low insertion force, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 2a and 2b illustrate, respectively, underside and topside isometric views of the upper sleeve component of FIGS. 1a through 1f.

FIGS. 2c and 2d illustrate, respectively, underside and topside plan views of the upper sleeve component.

FIGS. 2e and 2f illustrate, respectively, a cross-sectional view taken along cutline C-C of FIG. 2a and a side elevation view of the upper sleeve component.

FIGS. 3a and 3b illustrate, respectively, underside and topside isometric views of the lower sleeve component of FIGS. 1a through 1f.

FIGS. 3c and 3d illustrate, respectively, underside and topside plan views of the lower sleeve component.

FIGS. 3e and 3f illustrate, respectively, a cross-sectional view taken along cutline D-D of FIG. 3a and a side elevation view of the lower sleeve component.

FIG. 4c illustrates the PIA component and the lower sleeve component partially assembled with the first component.

FIG. 4d illustrates the PIA component and the lower sleeve component fully assembled with the first component.

FIG. 6c illustrates a cross-sectional view of the outer sleeve taken along cutline F-F during an initial stage of assembly.

FIG. 6d illustrates the cross-sectional view of the outer sleeve in an assembled position.

DESCRIPTION

Figure 1A:
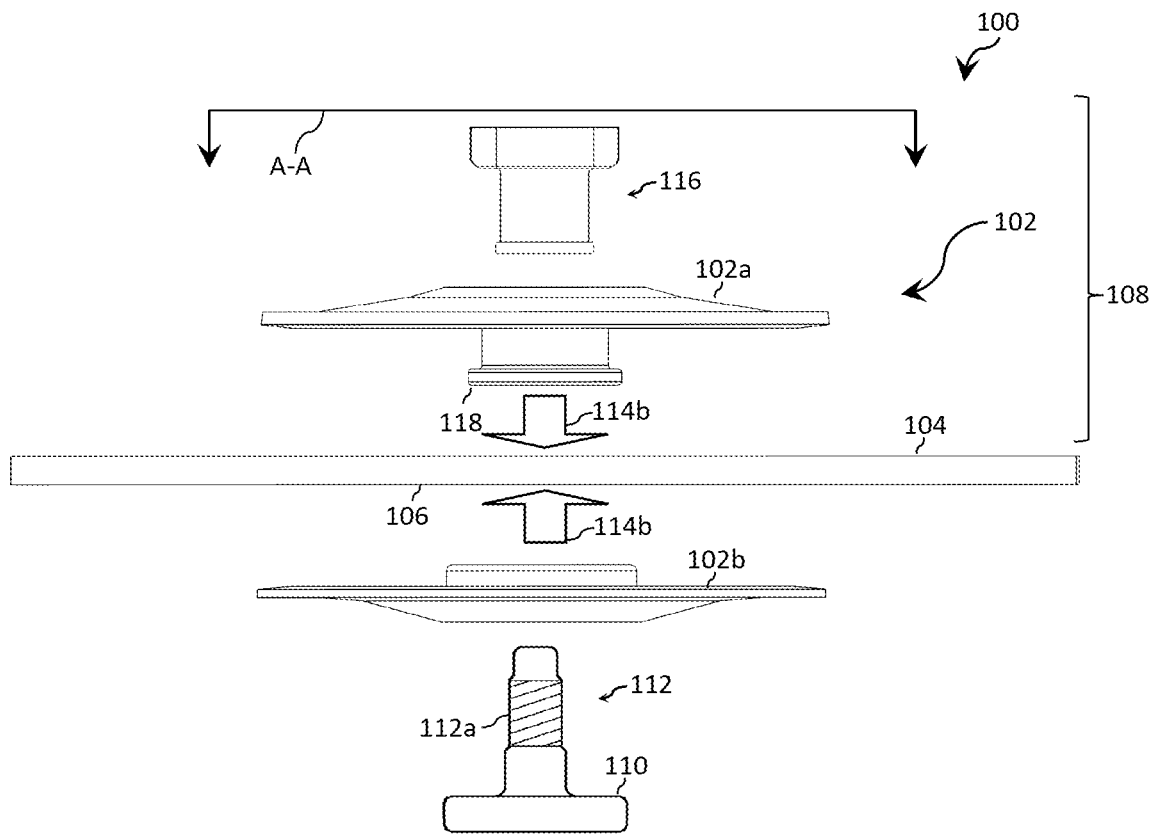
FIGS. 1a and 1b illustrate, respectively, assembly and assembled side views of an example fastening system in accordance with an aspect of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," "upper," "lower," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Disclosed is a fastening system with a sleeve assembly that can be captured into a component, telescopes up/down to allow the component to be fully seated before fastening, and offers tolerance compensation. In addition, the sleeve can be attached using low insertion force to permit, for example, manual assembly by hand. In one example, a fastening system to couple a first component to a stud via a component opening formed in the first component comprises: an upper sleeve component defining an upper sleeve opening; and a lower sleeve component defining a lower sleeve opening, wherein the lower sleeve component comprises one or more flexible tabs configured to engage the upper sleeve component via the component opening; and a nut configured to pass through a sleeve opening, wherein the sleeve opening is defined by the upper sleeve opening and the lower sleeve opening. The lower sleeve component can comprises a lower spring flange and an outer sleeve extending therefrom, while the upper sleeve component can comprises an upper spring flange and an inner sleeve extending therefrom.

In another example, a part-in-assembly (PIA) component configured to engage a second opening of a second panel comprises: an internally-threaded nut having a head, a nut barrel, and an annular ledge, wherein the head and the annular ledge are positioned at opposite ends of the nut barrel; and an upper sleeve component having an upper spring flange, an inner sleeve, and an annular ledge at an end of the inner sleeve, wherein the inner sleeve defines an upper sleeve opening and one or more nibs protruding into the upper sleeve opening, and wherein the one or more nibs are configured to retain the nut within the upper sleeve opening. In some examples, the inner sleeve is configured to pass at least partially though a component opening to engage a lower sleeve component via one or more flexible tabs positioned thereon.

In some examples, each of the inner sleeve and the outer sleeve is configured to pass at least partially though the component opening to engage one another via the one or more flexible tabs. In some examples, the inner sleeve and the outer sleeve have different diameters and are configured to nest and telescope relative to one another. In some examples, the upper sleeve component comprises an annular ledge at an end of the inner sleeve opposite the upper spring flange. In some examples, the one or more flexible tabs are formed in the outer sleeve. In some examples, the one or more flexible tabs are angled toward the lower sleeve opening. In some examples, the one or more flexible tabs are angled away from the lower sleeve opening. In some examples, the one or more flexible tabs are formed on an edge of the outer sleeve and bent toward the upper sleeve opening. In some examples, the stud is fixed relative to a second component and the nut comprises nut threads configured to couple with threads formed on an outer surface of the stud. In some examples, the inner sleeve comprises one or more nibs protruding into the upper sleeve opening and configured to engage the nut.

Figure 1B:
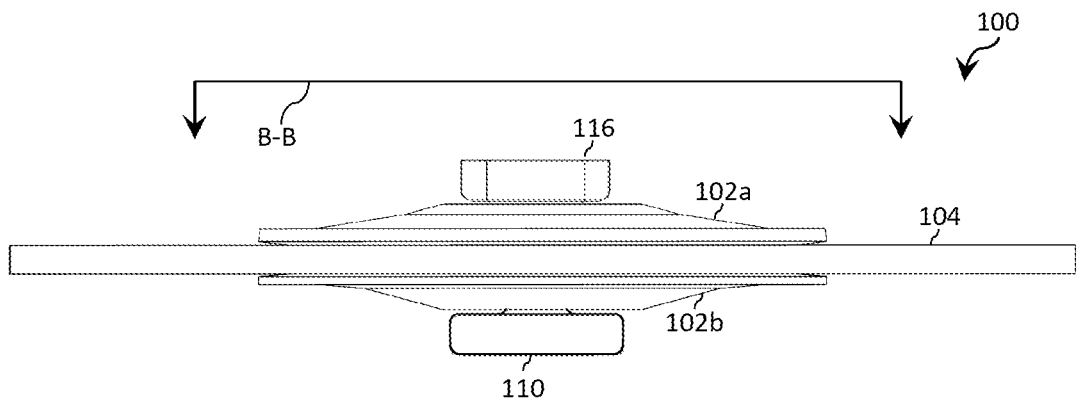
Figure 1D:
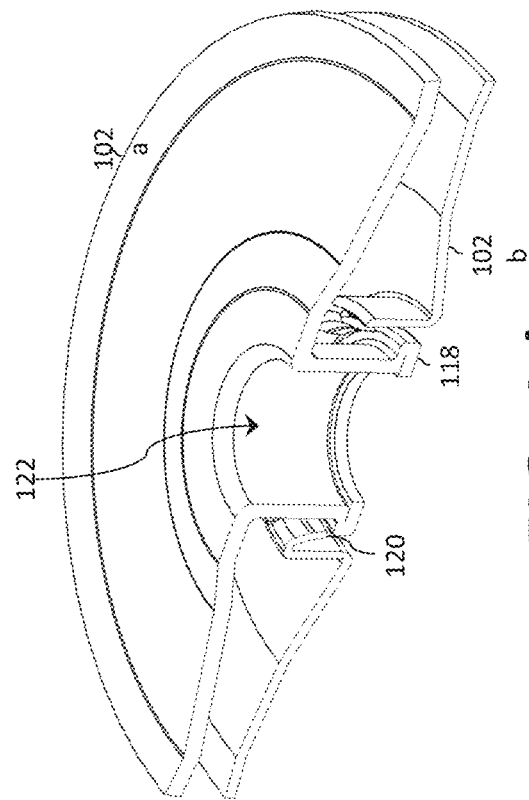
FIG. 1d illustrates cross-sectional view taken along the cut line of B-B of FIG. 1b of the fastening system.
Figure 1C:
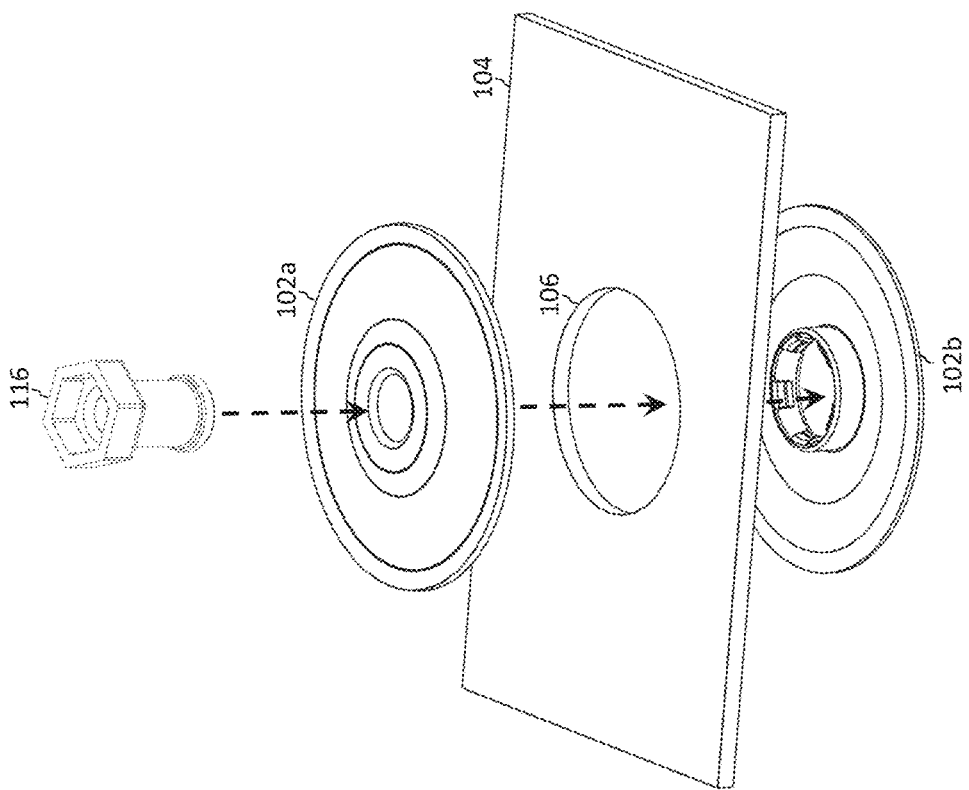
FIG. 1c illustrates a perspective assembly view of the example fastening system.
Figure 1E:
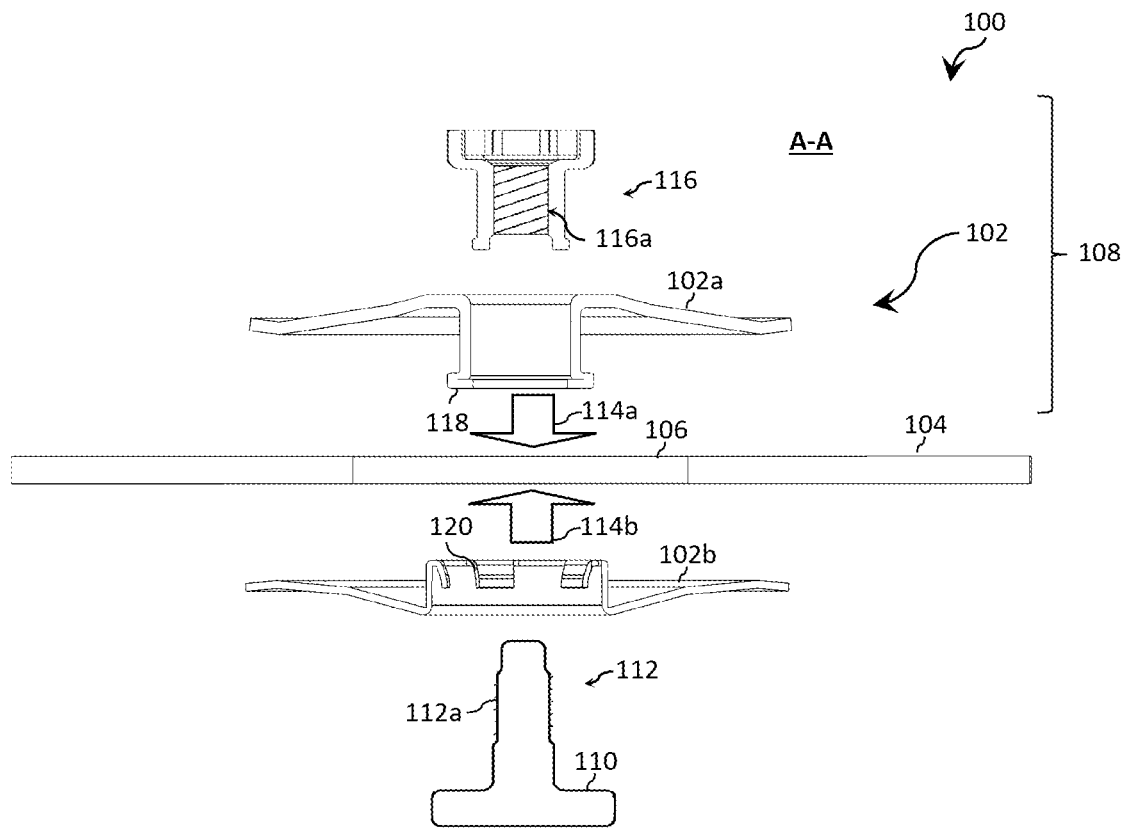
FIGS. 1e and 1f illustrate assembly and assembled side views of the assembly fastening system taken along cutline A-A of FIG. 1a and cutline B-B of FIG. 1b.
Figure 1F:
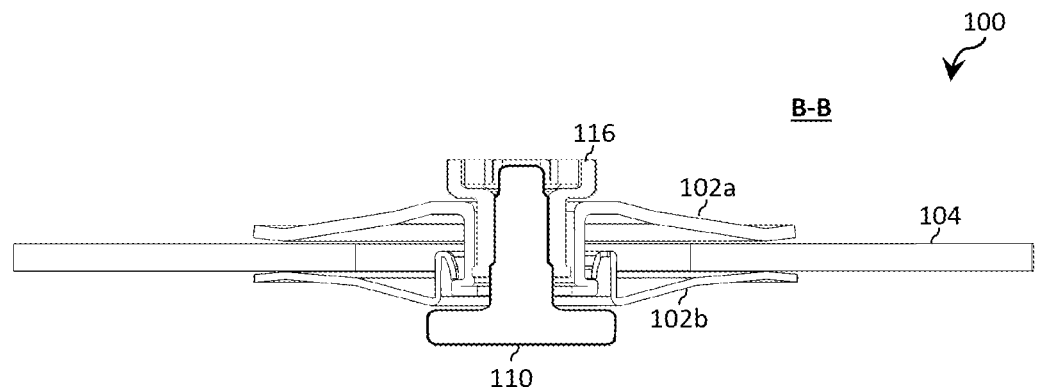

FIGS. 1a and 1b illustrate, respectively, assembly and assembled side views of an example fastening system 100 in accordance with an aspect of this disclosure, while FIG. 1c illustrates a perspective assembly view of the example fastening system 100. FIGS. 1e and 1f illustrate assembly and assembled side views of the assembly fastening system 100 taken along cutline A-A (of FIG. 1a) and cutline B-B (of FIG. 1b).

The illustrated fastening system 100 includes a sleeve assembly 102, a stud 112, and a nut 116 configured to join a first component 104 to a second component 110. The illustrated nut 116 is designed to screw onto the stud 112, which may be threaded and/or fixed relative to the second component 110. In the illustrated example, the sleeve assembly 102 is generally circular and defines a circular sleeve opening 122 at its center. The sleeve opening 122 is sized and shaped to receive the stud 112 and/or the nut 116. The sleeve assembly 102 and nut 116 provide tolerance compensation (e.g., axially and radially) when fastening to a stud 112.

The first component 104 and the second component 110 may be, for example, automotive panels and/or components. Depending on the application, the first component 104 and/or the second component 110 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In the automotive industry, example first components 104 and second components 110 include, without limitation, door trim panels, moldings, trim pieces, hoods, doors, pillars (e.g., an A-pillar, B-pillar, C-pillar, etc.), dashboard components (e.g., a cross member, bracket, frame, etc.), seat frames, center consoles, fenders, sheet metal framework, or the like. The various components and subassemblies of the fastening system 100 can be fabricated from synthetic or semi-synthetic polymers, composite materials, metals, or a combination thereof. In some examples, all components of the fastening system 100 may be fabricated from metal or a metal alloy to enable the fastening system 100 to withstand higher temperatures and/or mitigate clamp load relaxation over time.

The first component 104 includes one or more component openings 106 configured to receive the sleeve assembly 102, while the second component 110 includes or is associated with one or more studs 112 configured to engage the one or more nuts 116. As illustrated, each of the one or more studs 112 is generally perpendicular to the second component 110. The stud 112 can be coupled to, formed on, or otherwise associated with the second component 110. In the illustrated example, the stud 112 is a threaded stud and the second component 110 is represented as a small disk; however, the stud 112 can be attached to, passed through, or otherwise used with virtually any component a user wishes to attach to the first component 104 using a stud 112.

The sleeve assembly 102 generally comprises an upper sleeve component 102a and a lower sleeve component 102b. As illustrated, the upper sleeve component 102a and the lower sleeve component 102b are substantially concentric with one another to yield the assembled sleeve assembly 102. The upper sleeve component 102a and the lower sleeve component 102b include, respectively, an upper sleeve opening 122a and a lower sleeve opening 122b that collectively define the sleeve opening 122 when the sleeve assembly 102 is assembled. The upper and lower sleeve components 102a, 102b of the sleeve assembly 102 are fabricated from a generally rigid material, such as metal, synthetic or semi-synthetic polymers, composite materials, or a combination thereof.

The upper sleeve component 102a and the lower sleeve component 102b are connected to one another via the component opening 106 formed in the first component 104. When assembled, as indicated by the arrows 114a, 114b, the first component 104 is sandwiched between the upper sleeve component 102a and the lower sleeve component 102b such that the upper sleeve component 102a is on one side of the first component 104 and the lower sleeve component 102b is on the other side of the first component 104. In some examples, the upper sleeve component 102a comprises one or more first retention features (e.g., an annular ledge 118) configured to engage one or more second retention features (e.g., a plurality of flexible tabs 120, nibs, or the like) positioned on the lower sleeve component 102b.

For the tab configuration (as opposed to nibs), the flexible tabs 120 are designed to flex. The flexible tabs 120 are formed from a portion of the outer sleeve 304 and are angled (e.g., bent or otherwise formed) either toward the lower sleeve opening 122b (e.g., inside outer sleeve 304), away from the lower sleeve opening 122b (e.g., outside the outer sleeve 304), or a combination thereof. The flexible tabs 120 are designed to traverse the annular ledge 118 during insertion. The annular ledge 118 is illustrated as a flange or annular ring, though other configurations are contemplated. Once past the annular ledge 118, the flexible tabs 120 flex back to or near their original position to form a joint that is not easily removed. The number of flexible tabs 120 (or nibs) can vary around the diameter based on the retention and insertion forces needed. The flexible tabs 120 can be angled inward and/or outward from the lower sleeve component 102b and used to retain multiple items. While the flexible tabs 120 are primarily described as retaining the lower sleeve component 102b relative to the upper sleeve component 102a, as will be described, the flexible tabs 120 could instead retain the lower sleeve component 102b to the component opening 106, a shaft, etc.

The stud 112 and the nut 116 are configured to engage one another through the sleeve opening 122 formed in the sleeve assembly 102. In some examples, the stud 112 and the nut 116 are configured to threadedly couple with one another. In such an example, the stud 112 comprises stud threads 112a formed in or on its outer surface, while the nut 116 comprises corresponding nut threads 116a formed in or on its inner surface. In some examples, the nut 116 is inserted into and retained by the upper sleeve component 102a to define a part-in-assembly (PIA) component 108. As will be discussed in connection with FIGS. 4a and 4b, the PIA component 108 may be pre-assembled at a factory and shipped to an end-user along with the lower sleeve component 102b for final assembly with a first panel 104.

While only a single sleeve assembly 102, a single component opening 106 in the first component 104, and a single stud 112 on the second component 110 are illustrated in the examples, it should be appreciated that a given first component 104 may include multiple component openings 106 and the second component 110 may include multiple studs 112, depending on the number of fastener points to be used between the first and second components 104, 110. For example, larger components typically employ more fastener points.

FIGS. 2a and 2b illustrate, respectively, underside and topside isometric views of the upper sleeve component 102a of FIGS. 1a through 1f, while FIGS. 2c and 2d illustrate, respectively, underside and topside plan views of the upper sleeve component 102a. Finally, FIGS. 2e and 2f illustrate, respectively, a cross-sectional view taken along cutline C-C (FIG. 2a) and a side elevation view of the upper sleeve component 102a. As illustrated, the upper sleeve component 102a generally comprises an upper spring flange 202, an inner sleeve 204, and the annular ledge 118. The inner sleeve 204 is generally cylindrical and defines the upper sleeve opening 122a therethrough. The inner sleeve 204 comprises the upper spring flange 202 at its first end and the annular ledge 118 at its second end. As illustrated, the annular ledge 118 is formed at an edge of the second end of the inner sleeve 204, though other locations are possible. As illustrated, the upper spring flange 202 is generally circular and the inner sleeve 204 extends perpendicularly from the undersides of the upper spring flange 202. In some examples, as illustrated, the upper spring flange 202, the inner sleeve 204, and the annular ledge 118 are substantially concentric with one another.

FIGS. 3a and 3b illustrate, respectively, underside and topside isometric views of the lower sleeve component 102b of FIGS. 1a through 1f, while FIGS. 3c and 3d illustrate, respectively, underside and topside plan views of the lower sleeve component 102b. Finally, FIGS. 3e and 3f illustrate, respectively, a cross-sectional view taken along cutline D-D (FIG. 3a) and a side elevation view of the lower sleeve component 102b.

As illustrated, the lower sleeve component 102b is structurally similar to the upper sleeve component 102a, for example, the lower spring flange 302 and the outer sleeve 304 are similarly configured. The inner and outer sleeves 204, 304, however, have different diameters such that they can be nested and telescope relative to one another. Further, the outer sleeve 304 comprises a plurality of flexible tabs 120 (or another form of retention features) configured to engage the annular ledge 118. The flexible tabs 120 can be formed in or on the outer sleeve 304 in multiple ways. For example, the flexible tabs 120 can be formed in the outer sleeve 304 and/or from material at the end of the outer sleeve 304. In the illustrated example, the one or more flexible tabs 120 are formed on an edge of the outer sleeve 304 and bent toward and/or into the upper sleeve opening 122a. In some examples, as illustrated, the lower spring flange 302 and the outer sleeve 304 are substantially concentric with one another. Therefore, the different diameters of the inner and outer sleeves 204, 304, together with the plurality of flexible tabs 120, allow the upper sleeve component 102a and the lower sleeve component 102b to nest and telescope relative to one another, thus allowing the components to be fully seated before fastening.

The flexibility and angle (relative to the interior wall 304a of the outer sleeve 304) of the flexible tabs 120 provides tolerance compensation during assembly. In some examples, cutouts can be added to the flexible tabs 120 to reduce the forces and allow for more flexibility. While five are illustrated, the number of flexible tabs 120 around the perimeter of the outer sleeve 304 can be increased or decreased based on the retention and insertion forces needed (or desired). Further, while illustrated as generally rectangular, the general shape of the flexible tabs 120, including length, width, and thickness can be varied to change push-on and retention forces or otherwise achieve different desired force profiles. For example, the flexible tabs 120 formed from the outer sleeve 304 can be formed in and angled inward (or outward) relative to the outer sleeve 304, examples of which will be described and illustrated in connection with the FIGS. 4a through 7d.

Figures 4A, 4B:
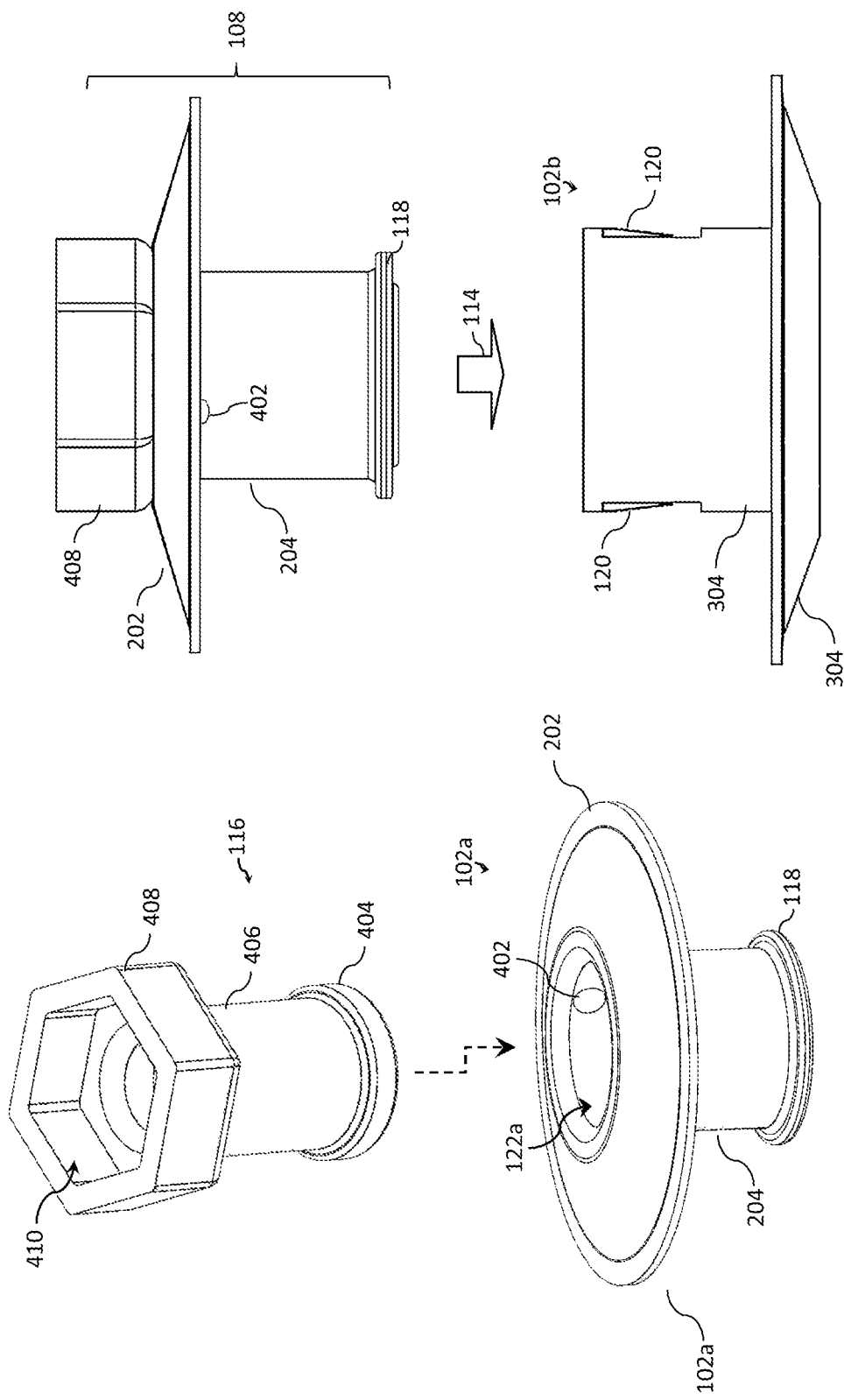
FIG. 4a illustrates an example assembly view of the nut and the upper sleeve component.
FIG. 4b illustrate an assembly diagram of the PIA component and the lower sleeve component prior to assembly with the first component.

FIG. 4a illustrates an example assembly view of the nut 116 and the upper sleeve component 102a. The upper sleeve component 102a includes an upper spring flange 202, an inner sleeve 204, and one or more integrated retention features. In the illustrated example, the inner sleeve 204 includes the upper spring flange 202 at one end, and the annular ledge 118 at the other. The upper spring flange 202 is configured to provide axial tolerance compensation and reduce clamp load. Reducing clamp load mitigates risk of damage to the first component 104. The combination of the upper spring flange 202 and the lower spring flange 302 provides axial tolerance compensation in both the upward and downward directions. The one or more integrated retention features are illustrated as an annular ledge 118 and a nib 402. The annular ledge 118 acts as a retention feature and is configured to cooperate with a corresponding retention feature on the lower sleeve component 102b (e.g., the flexible tabs 120), while the nib 402 engage a nut barrel 406 to retain the nut 116 within the upper sleeve opening 122a of the inner sleeve 204. In some examples, the inner sleeve 204 includes one or more nibs 402 (additionally or alternatively, flexible tabs) protruding toward an inner diameter of the inner sleeve 204 to engage the nut 116. For example, the one or more nibs 402 retain the nut 116 relative to the inner sleeve 204 (e.g., within the upper sleeve opening 122a).

The nut 116 generally comprises a head 408, the nut barrel 406, and an annular ledge 404. As illustrated, the head 408 and the annular ledge 404 are positioned at opposite ends of the nut barrel 406. The nut 116 is an internally-threaded nut and configured to threadedly engage the stud 112. To that end, the nut threads 116a are formed to cover a partial length or a full length of the interior surface of the limiting nut barrel 406. The head 408 defines a recessed pattern 410 (illustrated as a hex) configured to engage a driving tool (e.g., Allen wrench, screw driver, etc.). The nut barrel 406 acts in a load limiting capacity to withstand the clamp load when the nut 116 is tightened. The annular ledge 404 acts as a retention feature, but also increases the bearing area and retention to withstand clamp load. The one or more nibs 402 act as a retention feature on the annular ledge 404 of the nut 116. For example, the one or more nibs 402 snapped between the annular ledge 404 and the head 408.

FIG. 4b illustrate an assembly diagram of the PIA component 108 and the lower sleeve component 102b prior to assembly with the first component 104. As illustrated, the nut 116 and upper sleeve component 102a are pre-assembled to form the PIA component 108. The lower sleeve component 102b includes a lower spring flange 302, an outer sleeve 304, and one or more integrated retention features. In some examples, the PIA component 108 can be pre-captured onto the first component 104 via integrated subassembly features. In the illustrated example, the outer sleeve 304 includes the lower spring flange 302 at one end that is configured to provide axial tolerance compensation and reduce clamp load. The one or more integrated retention features are illustrated as flexible tabs 120 (additionally or alternatively, nibs) that protruded toward an inner diameter of the outer sleeve 304 to engage the inner sleeve 204.

FIG. 4c illustrates the PIA component 108 and the lower sleeve component 102b partially assembled with the first component 104, while FIG. 4d illustrates the PIA component 108 and the lower sleeve component 102b fully assembled with the first component 104. As illustrated, the nut 116, the upper sleeve component 102a, and the lower sleeve component 102b can telescope relative to one another to allow the nut threads 116a of the nut 116 to clear the stud 112. In some examples, the components of the fastening system 100 can be preassembled with the first component 104 while still allowing telescoping of the nut 116, the upper sleeve component 102a, and the lower sleeve component 102b. Such telescoping is beneficial as it enables the first component 104 to be fully seated (e.g., for gasket surfaces) before an operator begins tightening the nut 116 to the stud 112. In addition, with an oversized opening 106 in the first component 104 compared to outer sleeve 304 of the lower sleeve component 102b, the assembly (e.g., the PIA component 108 and the lower sleeve component 102b) can move radially for tolerance compensation.

FIG. 4b illustrates the nut 116 assembly screwed onto the stud 112, but before full spring compression of the sleeve assembly 102. As the nut 116 is fully tightened the upper sleeve component 102a and lower sleeve component 102b compress providing clamp load on the first component 104 sandwiched between the upper sleeve component 102a and lower sleeve component 102b. As this is happening, the nut 116 travels downward until it is substantially flush with the bottom surface of the upper spring flange 202. Therefore, the bottom of the nut 116 and the bottom of the upper spring flange 202 will rest in substantially the same plane (e.g., flat surface) when the nut 116 is fully tightened onto the stud 112.

Figure 5C:
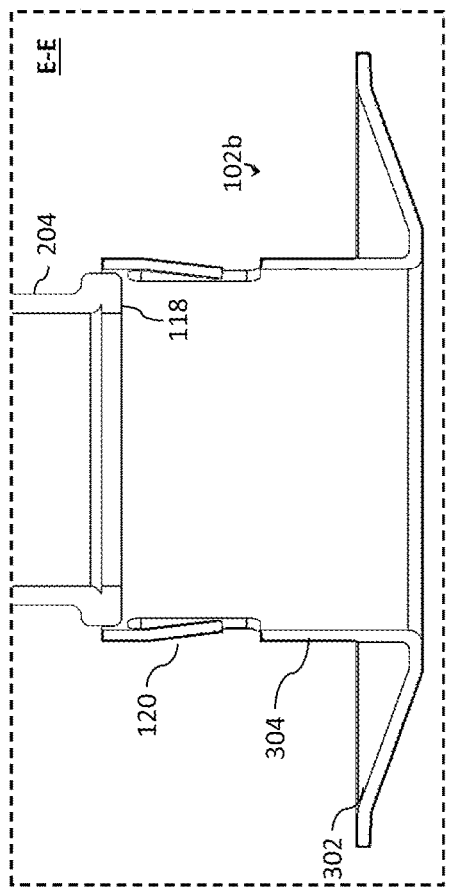
FIG. 5c illustrates a cross-sectional view of the outer sleeve taken along cutline E-E during an initial stage of assembly.
Figure 5D:
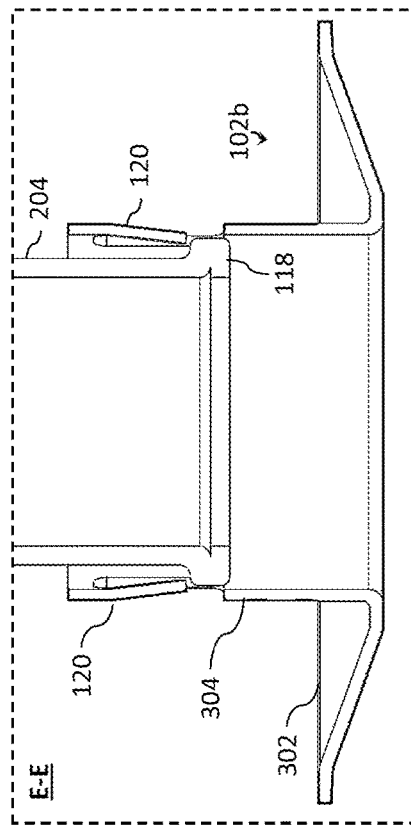
FIG. 5d illustrates the cross-sectional view of the outer sleeve in an assembled position.
Figure 5A:
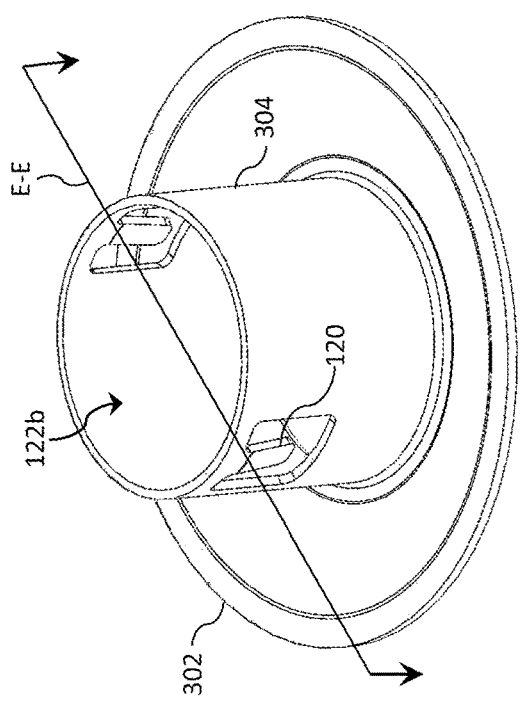
FIG. 5a illustrates an underside isometric view of the outer sleeve of FIGS. 4a through 4d.
Figure 5B:
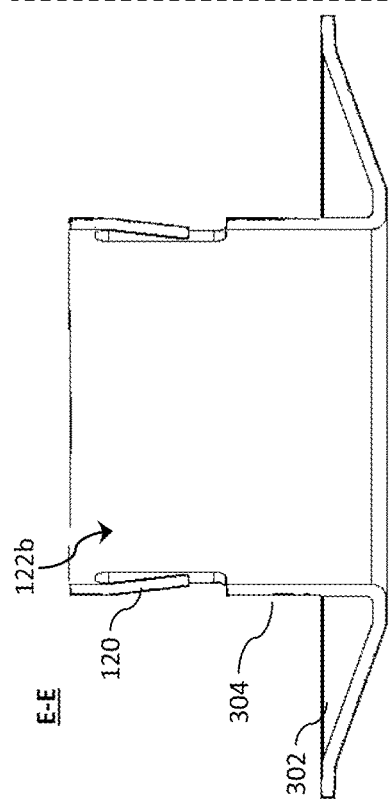
FIG. 5b illustrates a cross-sectional view of the outer sleeve taken along cutline E-E.

FIG. 5a illustrates an underside isometric view of the outer sleeve 304 of FIGS. 4a through 4d, while FIG. 5b illustrates a cross-sectional view of the outer sleeve 304 taken along cutline E-E. In the illustrated example, two flexible tabs 120 are formed from the outer sleeve 304 and angled inward to retain onto the inner sleeve 204 and/or annular ledge 118 of the upper sleeve component 102a. While two are illustrated, the number of flexible tabs 120 around the diameter of the outer sleeve 304 can be increased or decreased based on the retention and insertion forces needed (or desired).

FIG. 5c illustrates a cross-sectional view of the outer sleeve 304 taken along cutline E-E during an initial stage of assembly, while FIG. 5d illustrates the cross-sectional view of the outer sleeve 304 in an assembled position. As illustrated in FIG. 5c, the flexible tabs 120 are configured to flex and allow the annular ledge 118 to pass into the lower sleeve opening 122b. In some examples, the annular ledge 118 and the flexible tabs 120 can be shaped to serve as an integrated pilot feature configured to help guide the insertion over the annular ledge 118. For example, the flexible tabs 120 can serve as a ramp from the direction of assembly to guide the annular ledge 118 during assembly with the lower sleeve opening 122b. FIG. 5d illustrates the flexible tabs 120 upon passing the annular ledge 118 and after returning to or near their original position. The interference diameters between the flexible tabs 120 and annular ledge 118 create retention of the upper sleeve component 102a and lower sleeve component 102b.

Figure 6A:
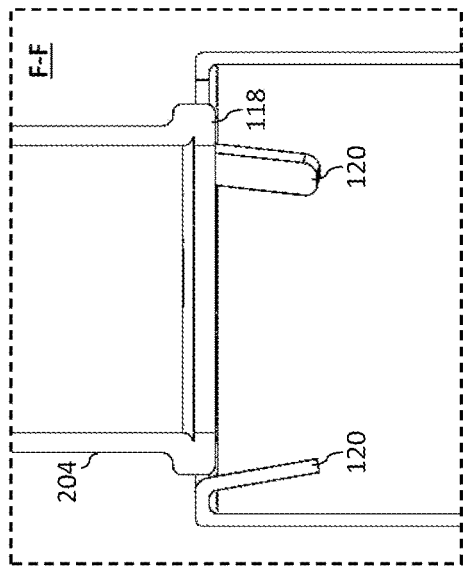
FIGS. 6a through 6d illustrate a lower sleeve component in accordance with another aspect of this disclosure.
Figure 6B:
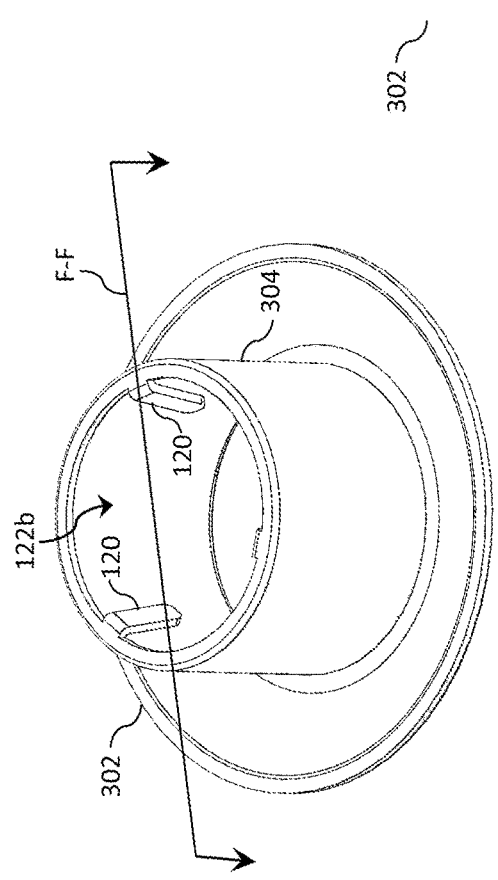

FIGS. 6a through 6d illustrate a lower sleeve component 102b in accordance with another aspect of this disclosure. FIG. 6a illustrates an underside isometric view of the outer sleeve 304, while FIG. 6b illustrates a cross-sectional view of the outer sleeve 304 taken along cutline F-F. The lower sleeve component 102b is substantially the same as the lower sleeve component 102b illustrated and described in connection with FIGS. 1a through 1f and FIGS. 3a through 3f, except three flexible tabs 120 are formed from the end of the outer sleeve 304, angled inward to retain onto the inner sleeve 204 and/or annular ledge 118 of the upper sleeve component 102a.

Figure 6C:
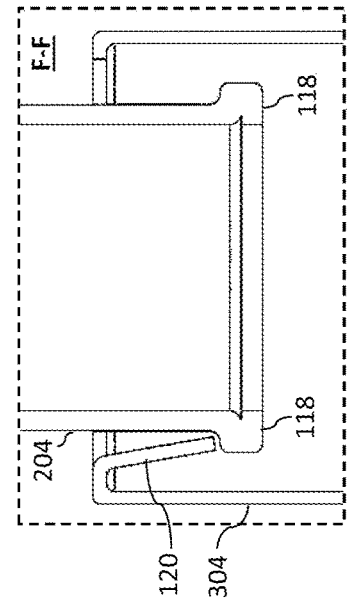
Figure 6D:
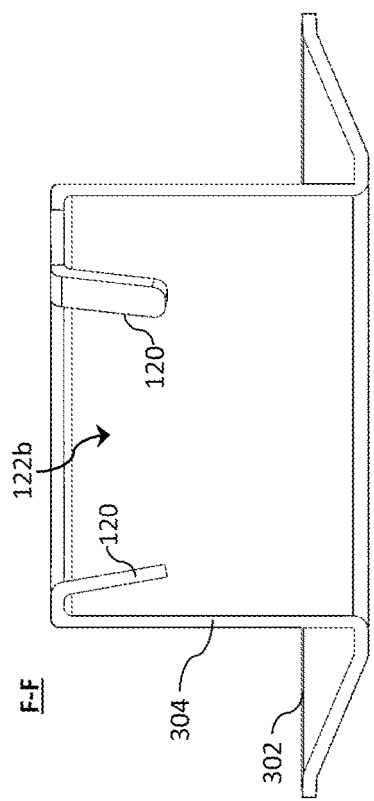

FIG. 6c illustrates a cross-sectional view of the outer sleeve 304 taken along cutline F-F during an initial stage of assembly, while FIG. 6d illustrates the cross-sectional view of the outer sleeve 304 in an assembled position. As illustrated in FIG. 6c, the flexible tabs 120 are configured to flex and allow the annular ledge 118 to pass into the lower sleeve opening 122b. In some examples, the flexible tabs 120 can be shaped to serve as a pilot feature configured to help guide the insertion over the annular ledge 118. FIG. 5d illustrates the flexible tabs 120 upon passing the annular ledge 118 and after returning to or near its original position. The interference diameters between the flexible tabs 120 and annular ledge 118 create retention of the upper sleeve component 102a and lower sleeve component 102b. In some examples, the angle and/or flexibility of the flexible tabs 120 may be adjusted to allow the flexible tabs 120 to retain a shaft by friction of the flexible tabs 120 on the shaft. The shaft can be the inner sleeve 204 as illustrated, the stud 112, a bolt, rod, or another shaft-like structure. To that end, geometry modifications can be made to the flexible tabs 120, such as changing the profile such that a smooth edge (instead of sharp) contacts the shaft. This could desirable in situations where the shaft is captured, but still desirable to be able to move axially.

In some examples, it may be desirable to attach the lower sleeve component 102b to the first component 104 without using an upper sleeve component 102a. To that end, the lower sleeve component 102b may be configured to directly contact the first component 104 via one or more flexible tabs 120.

Figure 7A:
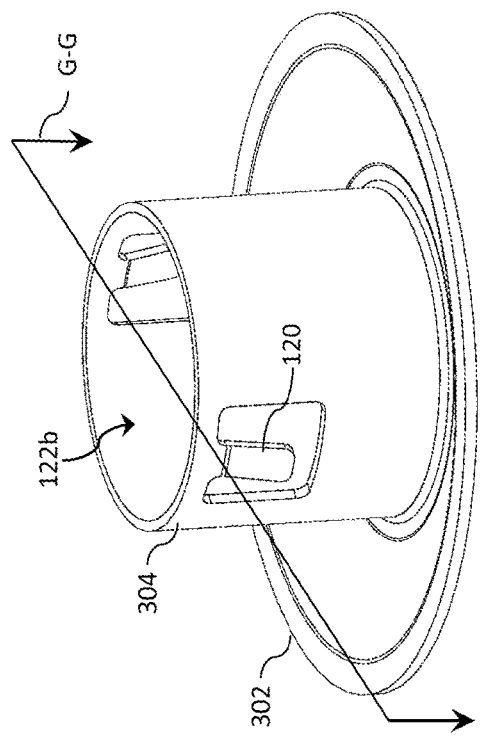
FIGS. 7a through 7d illustrate a lower sleeve component configured to engage the first component without using an upper sleeve component.
Figure 7C:
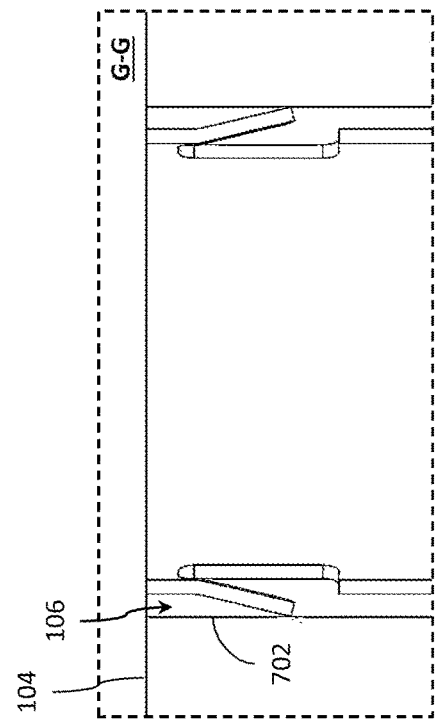
Figure 7B:
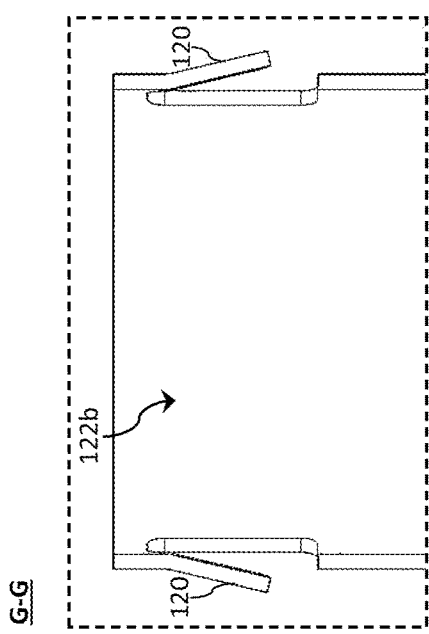

FIGS. 7a through 7d illustrate a lower sleeve component 102b configured to engage the first component 104 without using an upper sleeve component 102a. FIG. 7a illustrates an underside isometric view of the lower sleeve component 102b, while FIG. 7b illustrates a cross-sectional view of the lower sleeve component 102b taken along cutline G-G. FIG. 7c illustrates a cross-sectional view of the lower sleeve component 102b taken along cutline G-G assembled with the first component 104.

Figure 7D:
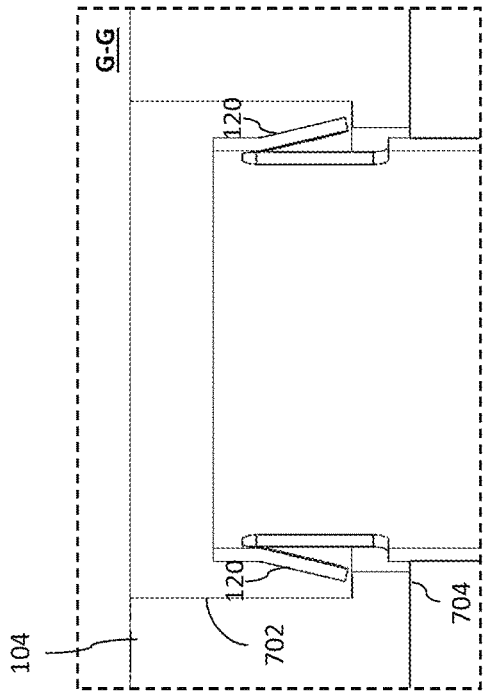

The lower sleeve component 102b of FIGS. 7a through 7d is substantially the same as the lower sleeve component 102b illustrated and described in connection with FIGS. 5a through 5d, except that the flexible tabs 120 formed from the outer sleeve 304 are angled outward rather than inward. By angling the flexible tabs 120 outward, the flexible tabs 120 can retain the lower sleeve component 102b relative to the first component 104 by friction of the flexible tabs 120 on an inner wall 702 of the component opening 106. In some examples, the wall 702 of the component opening 106 includes a retaining feature. For example, FIG. 7d illustrates the lower sleeve component 102b retained by snapping past a retaining feature 704 in a component opening 106. In this example, the retaining feature 704 is a ledge.

The disclosed fastening system 100 and components thereof are generally lightweight due to thin materials used to construct the various components. In addition, there can be minimal material waste. For example, when produced from a deep drawn metal process, minimal scrap is associated with creating the flexible tabs 120, which can be taken from material already needed for drawing the sleeve.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A fastening system to couple a first component to a stud via a component opening formed in the first component, the fastening system comprising:
   an upper sleeve component defining an upper sleeve opening;
   a lower sleeve component defining a lower sleeve opening,
      wherein the lower sleeve component is configured to engage the upper sleeve component via the component opening, and
      wherein the lower sleeve component comprises one or more flexible tabs configured to extend toward the lower sleeve opening and engage the upper sleeve component; and
   a nut configured to pass through a sleeve opening,
      wherein the sleeve opening is defined by the upper sleeve opening and the lower sleeve opening.

2. The fastening system of claim 1, wherein the lower sleeve component comprises a lower spring flange and an outer sleeve extending therefrom.

3. The fastening system of claim 2, wherein the upper sleeve component comprises an upper spring flange and an inner sleeve extending therefrom.

4. The fastening system of claim 3, wherein each of the inner sleeve and the outer sleeve is configured to pass at least partially though the component opening to engage one another via the one or more flexible tabs.

5. The fastening system of claim 3, wherein the inner sleeve and the outer sleeve have different diameters and are configured to nest and telescope relative to one another.

6. The fastening system of claim 3, wherein the upper sleeve component comprises an annular ledge at an end of the inner sleeve opposite the upper spring flange.

7. The fastening system of claim 3, wherein the inner sleeve comprises one or more nibs protruding into the upper sleeve opening and configured to engage the nut.

8. The fastening system of claim 2, wherein the one or more flexible tabs are formed in the outer sleeve.

9. The fastening system of claim 8, wherein the one or more flexible tabs are angled toward the lower sleeve opening.

10. The fastening system of claim 8, wherein the one or more flexible tabs are angled away from the lower sleeve opening.

11. The fastening system of claim 2, wherein the one or more flexible tabs are formed on an edge of the outer sleeve and bent toward the upper sleeve opening.

12. The fastening system of claim 1, wherein the stud is fixed relative to a second component and the nut comprises nut threads configured to couple with threads formed on an outer surface of the stud.

13. A sleeve assembly to couple with a first component via a component opening formed in the first component, the sleeve assembly comprising:

an upper sleeve component having an upper spring flange and an inner sleeve extending therefrom,
wherein the inner sleeve defines an upper sleeve opening; and
a lower sleeve component having a lower spring flange, an outer sleeve extending therefrom, and one or more flexible tabs configured to extend toward the lower sleeve opening to engage the upper sleeve component,
wherein the lower sleeve component is configured to engage the upper sleeve component via the component opening,
wherein the outer sleeve defines a lower sleeve opening, and
wherein the inner sleeve and the outer sleeve are configured to telescope relative to one another.

14. The sleeve assembly of claim 13, wherein each of the inner sleeve and the outer sleeve is configured to pass at least partially though the component opening to engage one another via the one or more flexible tabs.

15. The sleeve assembly of claim 13, wherein the upper sleeve component comprises an annular ledge at an end of the inner sleeve opposite the upper spring flange.

16. The sleeve assembly of claim 13, wherein the one or more flexible tabs are formed in the outer sleeve and are angled toward the lower sleeve opening.

17. The sleeve assembly of claim 13, wherein the one or more flexible tabs are formed in the outer sleeve and are angled away from the lower sleeve opening.

18. The sleeve assembly of claim 13, wherein the one or more flexible tabs are formed on an edge of the outer sleeve and bent toward and into the upper sleeve opening.

19. A part-in-assembly (PIA) component configured to engage a second opening of a second panel, the PIA component comprising:
an internally-threaded nut having a head, a nut barrel, and an annular ledge,
wherein the head and the annular ledge are positioned at opposite ends of the nut barrel; and
an upper sleeve component having an upper spring flange, an inner sleeve, and an annular ledge at an end of the inner sleeve,
wherein the inner sleeve defines an upper sleeve opening and one or more nibs protruding into the upper sleeve opening, and
wherein the one or more nibs are configured to retain the nut within the upper sleeve opening.

20. The PIA component of claim 19, wherein the inner sleeve is configured to pass at least partially though a component opening to engage a lower sleeve component via one or more flexible tabs positioned thereon.

* * * * *